United States Patent Office 3,299,436
Patented Jan. 17, 1967

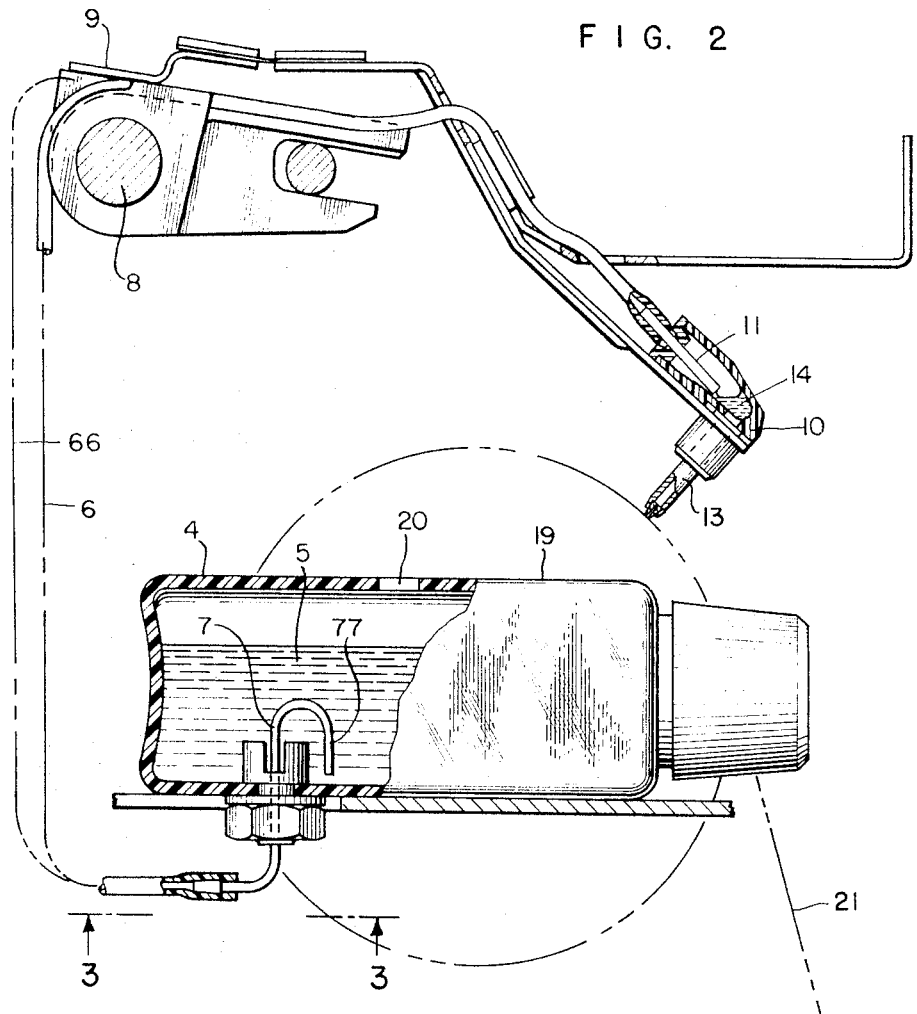
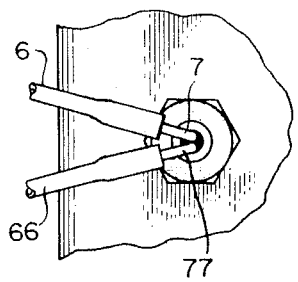
FIG. 2
FIG. 3
INVENTORS.
JACQUES BEHMORAS
STANLEY WLAZ
BY Arthur H. Swenson
ATTORNEY.

3,299,436
RECORDER USING DUAL CAPILLARY INK SUPPLY
Jacques Behmoras, Upper Darby, Pa., and Stanley G. Wlaz, Haddonfield, N.J., assignors to Honeywell Inc., Minneapolis, Minn., a corporation of Delaware
Filed July 1, 1964, Ser. No. 379,563
4 Claims. (Cl. 346—140)

This invention relates to recorders which are of two types. Strip chart recorders are those in which the record-receiving medium is an endless belt or long strip of record-receiving material, such as paper, which is moved at a variable or uniform speed relative to a pen, which pen is moved at an angle to the direction of motion of the chart. Circular-chart recorders are those in which the record-receiving medium, such as paper, is in the form of a disc, which is rotated at a variable or uniform speed relative to the pen, which is moved generally radially of the chart.

This invention relates to means for conveying ink from a stationary container, such as a bottle or sac, to a movable pen at a varying distance from the container.

It is an object of this invention to provide a stationary container for ink, a capillary flexible tube connected at one end to said container and wound in a coil, a movable pen located above the level of the free surface of the ink in the container and connected to the opposite end of the tube from the container and adapted for movement across the chart, and a second capillary flexible tube connected at one end to said pen and wound in a coil and connected at the other end to said container. Movement of the pen thus causes the wound portion of one tube to expand while the wound portion of the other tube contracts. This expansion and contraction of the tubes together with the cushion of air in the ink reservoir in the pen, as is hereinafter mentioned, results in a steady supply of ink to the record-receiving material with little or no tendency for the ink to squirt out of the pen upon contraction of the tubes and thus produce a blob or smear on the record, or to be drawn back into the tube upon expansion of the tubes and thus produce a skip or gap in the record.

Yet another object of this invention is to provide an ink supply system including a pair of flexible capillary tubes and a pen having a reservoir for ink connected between said tubes so that one tube may expand and contract while the other is contracting and expanding, thus permitting rapid movement of the pen across a relatively wide recording chart to provide a trace representative of the correspondingly rapid changes in a variable under measurement while minimizing the tendency for the ink to squirt from the pen or to be drawn back into the capillary tubing and thus result in skips or gaps in the record.

A better understanding of the present invention may be had from the following detailed description when read in connection with the accompanying drawings, in which:

FIG. 2 is a side elevation of the ink bottle and pen.

FIG. 3 is a bottom view of a portion of the ink bottle viewed from line 3—3.

Figure 1:
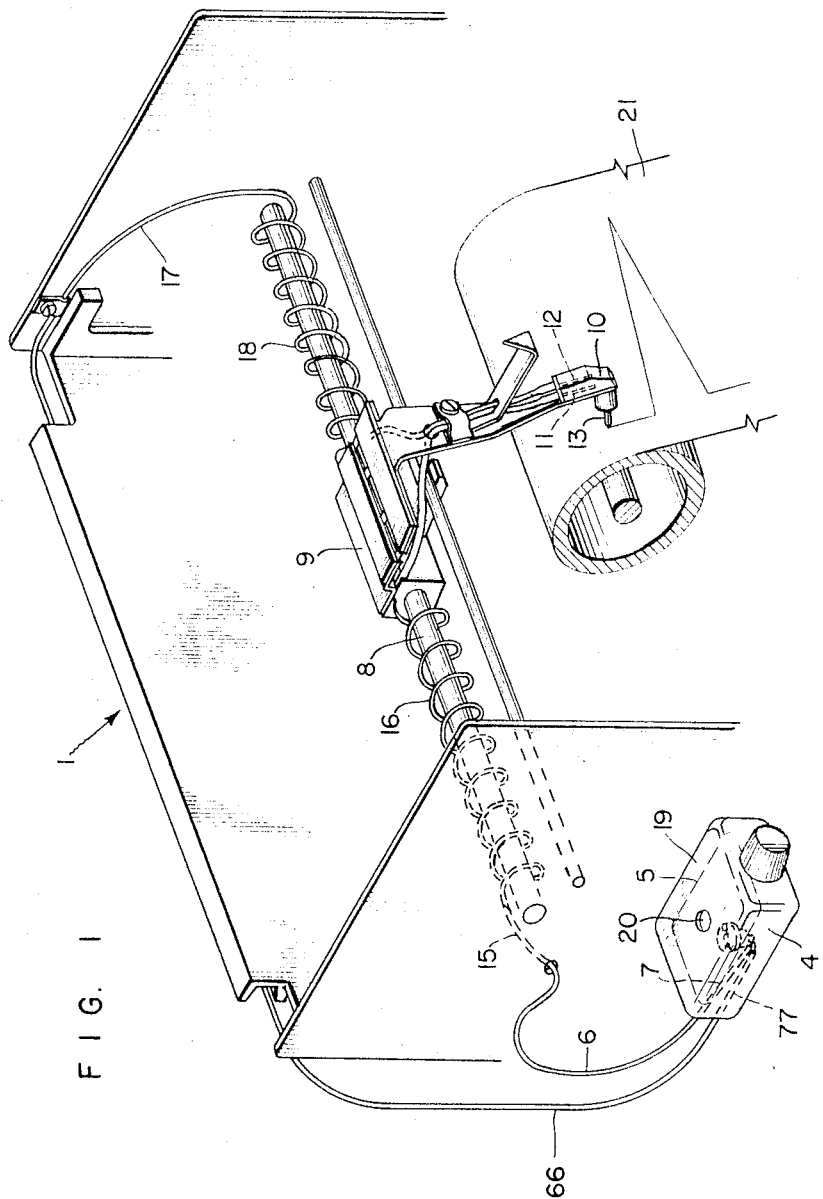
FIG. 1 is a diagrammatic or schematic view in front elevation.

The recorder illustrated herein is of the strip-chart type but might just as well be of the circular-chart type.

The recorder of this invention comprises a rigid case 1 having walls on which the parts of the ink supply system are mounted. An ink bottle 4 is mounted on case 1 by means (not shown). Bottle 4 may be flexible in whole or in part, so that it can be compressed or it may be rigid. A supply of ink 5 is contained within the bottle 4. The top level of the supply of ink 5 is below the level of the pen hereinafter mentioned. Ink bottle 4, in a preferred form of the invention, has two pieces of capillary tubing 6 and 66 passing through it and having ends 7 and 77 inside bottle 4. The ends of the tubings located within the bottle 4 are beneath the free surface of the ink 5.

Mounted on case 1 is a rod 8 which forms a guide or support for the pen carriage 9. Pen carriage 9 carries an ink reservoir 10 containing a supply of ink 14 which does not completely fill the ink reservoir 10. A perforated pen tip 13 leads from the bottom of the ink reservoir 10. A pair of tubings 11 and 12 form inlets from the outside of the ink reservoir 10 to the interior thereof.

Means are provided for conducting the ink from the ink bottle 4 to the pen 13. These means include a flexible capillary tube 15 connected at one end to the tubing 6 and connected at the other to the tubing 11 which enters the ink reservoir 10. The flexible tube 15 has a central portion wound into a generally cylindrical helix around the rod 8 as an axis.

Tube 15 may be conveniently made of "Saran" which is the trademark given to a group of tough, flexible, thermoplastics including polymeric vinylidene. Tube 15 may be conveniently made of twenty-two (22) gauge; i.e., of the following dimensions in inches—0.030 internal diameter and 0.010 wall.

The pen carriage 9 and the pen 13 are moved by means, such as an electric, pneumatic or other pen driving motor (not shown), which is responsive to the variable quantity of which a record is to be made. The record chart 21 upon which the record is to be made is supported by a platen 22 which is arranged to be driven at a constant or variable speed, as desired, by a chart drive mechanism (not shown). If desired, the chart drive mechanism may be of a type known in the art which is adjustable thereby to permit adjustment in the constant or variable speed at which the chart 21 is driven.

A second, flexible tube 17, which is similar in construction to tube 15, is connected at one end to the tubing 12, which communicates with the interior of the ink reservoir 10, and is connected, at its opposite end, to the tubing 66, which communicates with the interior of the ink bottle 4. Tube 17 has an intermediate portion 18 thereof wound into a generally cylindrical helix around the rod 8 as an axis. When priming the pen, a hole 20 is obstructed by a finger, which at the same time compresses ink bottle 4. The ink flows through coils 15 and 16 to reservoir 10 and fills the reservoir until the orifice of pen 13 is covered. At this time an air pocket is trapped in reservoir 10. Further pressure on bottle 4 will cause ink to squirt out of pen tip 13.

Variations in the variable quantity to which the pen driving motor responds will cause the pen carriage 9 and the pen 13 upon such variation in one direction to move to the left from the position in which they are shown in full lines in the drawings to the opposite end of the scale. This motion will cause the helical portion 16 of the tube 15 to expand and simultaneously will cause the helical portion 18 attached to the tube 17 to contract. Ink bottle 4 is below the level of the ink reservoir 10 and ink is conducted from the bottle 4 to the ink reservoir 10. Because of the air cushion above the level of the ink 14 in the ink reservoir 10, and the counter-acting change of volume and acceleration of the ink in tubes 15 and 17, upon movement of the pen carriage 9 from one end of the scale towards the other, a steady supply of ink to the recording member or chart 21 is obtained over a wide range of variation in the speed of movement of the pen 13 across member 21. The counter-acting change of volume and acceleration of the ink in tubes 15 and 17 minimizes the tendency for the ink to squirt out of pen 13 upon contraction of the tubes 16 and 18, or to be drawn back into the coils 16 and 18 upon expansion thereof and thus produce a skip or gap in the trace produced upon the record sheet 21.

In a modified form of the invention, tubing 66 may be omitted and the end of tubing 17 remote from ink reservoir 10 may be closed or sealed. Ink to the reservoir 10 from container 4 then flows through tubing 6 and coil 15 only. Upon movement of the pen carriage 9 back and forth across the scale, however, a similar counter-acting change of volume and acceleration in coils 16 and 18 occurs, as in the embodiment illustrated in FIG. 1, to minimize the tendency for ink to squire out of the pen 13 or to be drawn back into the coils 16 and 18 and thereby produce skips or gaps in the trace.

It will be apparent from the foregoing description that there has been provided, according to the present invention, a novel ink supply system for strip chart and/or circular chart recorders including a container for ink, a pair of flexible capillary tubes and a pen. The construction is such that one tube may expand and contract while the other is contracting and expanding. The resulting counter-acting changes of volume and acceleration in the capillary tubes permits rapid movement of the pen across the recording chart in producing the desired trace by stabilizing the flow of ink from the pen to the recording chart.

What is claimed is:

1. In a recorder having a chart in it, a case, a stationary ink container mounted on said case, a capillary tube having a helical portion intermediate its ends and wound about an axis spaced from said container so as to be movable longitudinally along said axis, a pen communicating with one end of said tube and discharging ink from said tube to said chart, the other end of said tube being fixed and communicating with said container, a means for moving said pen and the helical portion of said capillary tube along said axis in response to changes in a variable to be recorded, a second capillary tube communicating with said pen and having a helical portion intermediate its ends and wound about said axis so as to be movable longitudinally therealong in response to said means for moving said pen, and said helical portions of the capillary tubes being juxtapositioned said ink reservoir at selected positions to provide contracting and expanding changes of volume and acceleration of the ink in one of the capillary tubes while a simultaneous counterbalancing opposite change in volume and acceleration of the ink occurs in the other remaining capillary tube during movement of the pen to thereby provide a stabilizing effect on the flow of ink from the pen to the chart.

2. In a strip-chart recorder having a strip chart and means for moving it at a uniform speed, a case, a stationary ink container mounted on said case, a flexible capillary tube connected at one end to said ink container and having an intermediate, extensible, helical portion along its major axis, a rod extending along said major axis and providing a guide, a pen carriage mounted for movement along said rod and having the other end of said tube attached thereto, an ink reservoir mounted on said pen carriage and having sufficient capacity to contain a supply of ink in it and an air space above the free surface of said ink, the other end of said tube communicating with said ink reservoir, a pen mounted on and communicating with the bottom of said ink reservoir and movable over the chart to make a record thereon, a second flexible, capillary tube connected at one end to said ink container and having an intermediate, extensible, helical portion along its major axis, the other end of said second tube communicating with said ink reservoir, and said helical portions of the capillary tubes being juxtapositioned said ink reservoir at selected locations to provide contracting and expanding changes of volume and acceleration of the ink in one of the capillary tubes while a simultaneous counterbalancing opposite change in volume and acceleration of the ink occurs in the other remaining capillary tubes during movement of the pen to thereby provide a stabilizing effect on the flow of ink from the pen to the chart.

3. In a recorder, a stationary ink container, a flexible capillary tube having an intermediate portion looped about an axis located at a distance from said container so as to be movable longitudinally along said axis, one end of said tube being fixed and communicating with said container and the other end of said tube communicating with an ink reservoir having a greater capacity than the capacity of said tube, said reservoir containing a supply of ink having a free surface and a cushion of air above the free surface of the ink therein, a pen communicating with the bottom of said ink reservoir and positioned over a chart and discharging ink from said reservoir to said chart, and means for moving said pen along said axis in response to changes in a variable to be recorded, a second flexible, capillary tube having an intermediate, helical portion looped around said axis so as to be movable longitudinally along said axis, one end of said second tube being fixed and communicating with said container and the other end of said second tube communicating with said ink reservoir, said looped portions of the flexible capillary tubes being juxtapositioned said ink reservoir at selected locations to provide contracting and expanding changes of volume and acceleration of the ink in one of the capillary tubes while a simultaneous counterbalancing opposite change in volume and acceleration of the ink occurs in the remaining capillary tube during movement of the pen to thereby provide a stabilizing effect on the flow of ink from the pen to the chart.

4. In a recorder, a stationary ink container, a capillary tube looped intermediate its ends about an axis spaced from the container so as to be movable longitudinally along said axis, one end of said tube being fixed and communicating with said container and the other end of said tube being connected to an ink reservoir having a large capacity relative to the capacity of said tube, said ink reservoir containing a supply of ink having a free surface and a cushion of air above the free surface of the ink therein, a pen communicating with said ink reservoir below the level of the free surface of the ink therein and positioned over a chart and discharging ink from said reservoir to the chart, means moving said pen along said axis in response to changes in a variable to be recorded, a second capillary tube looped intermediate its ends about said axis so as to be moved longitudinally along said axis, one end of said second tube being fixed and communicating with said container and the other end of said second tube being connected to said ink reservoir, and said looped portions of the capillary tubes being juxtapositioned said ink reservoir at selected locations to provide contracting and expanding changes of volume and acceleration of the ink in one of the capillary tubes while a simultaneous counterbalancing opposite change in volume and acceleration of the ink occurs in the remaining capillary tube during movement of the pen to the chart.

References Cited by the Examiner

UNITED STATES PATENTS 3,102,770    9/1963    McKeegan _____ 346—140

RICHARD B. WILKINSON, *Primary Examiner.*

LEO SMILOW, *Examiner.*

JOSEPH W. HARTARY, *Assistant Examiner.*